(12) United States Patent
Morrison et al.

(10) Patent No.: US 9,104,403 B2
(45) Date of Patent: Aug. 11, 2015

(54) DATA PROCESSING SYSTEM HAVING SELECTIVE REDUNDANCY AND METHOD THEREFOR

(75) Inventors: Gary R. Morrison, Austin, TX (US); William C. Moyer, Dripping Springs, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 1110 days.

(21) Appl. No.: 12/858,599

(22) Filed: Aug. 18, 2010

(65) Prior Publication Data
US 2012/0047351 A1 Feb. 23, 2012

(51) Int. Cl.
*G06F 15/00* (2006.01)
*G06F 9/30* (2006.01)
*G06F 9/40* (2006.01)
*G06F 11/14* (2006.01)
*G06F 11/16* (2006.01)

(52) U.S. Cl.
CPC ........ *G06F 9/30145* (2013.01); *G06F 11/1405* (2013.01); *G06F 11/1497* (2013.01); *G06F 11/1479* (2013.01); *G06F 11/1629* (2013.01)

(58) Field of Classification Search
None
See application file for complete search history.

(56) References Cited

U.S. PATENT DOCUMENTS

| 5,732,209 | A | * | 3/1998 | Vigil et al. | 714/30 |
| 5,944,841 | A | * | 8/1999 | Christie | 714/38.11 |
| 6,782,445 | B1 | * | 8/2004 | Olgiati et al. | 711/100 |

OTHER PUBLICATIONS

Parashar et al. (A Complexity-Effective Approach to ALU Bandwidth Enhancement for Instruction-Level Temporal Redundancy, Mar. 2004, pp. 1-11).*
Ray et al. (Dual Use of Superscalar Datapath for Transient-Fault Detection and Recovery, 2001, pp. 214-224).*
U.S. Appl. No. 12/856,430, filed Aug. 13, 2010.
Hsu et al.; "Recomputing by Operand Exchanging: A Time-redundancy Approach for Fault-tolerant Neural Networks"; 1995; pp. 54-65; IEEE.
Karri et al.; "Algorithm Level Re-Computing Using Implementation Diversity: A Register Transfer Level Concurrent Error Detection Technique"; IEEE Transactions on Very Large Scale Integration (VLSI) Systems; Dec. 2002; pp. 864-875; vol. 10, No. 6; IEEE.
Parashar et al.; "A Complexity-Effective Approach to ALU Bandwidth Enhancement for Instruction-Level Temporal Redundancy"; Proceedings of the 31st Annual International Symposium on Computer Architecture; 2004; 11 pgs; IEEE.
Shareef et al.; "Selective Redundancy: Evaluation of Temporal Reliability Enhancement Scheme for Nanoelectronic Circuits"; 2008; pp. 895-898; IEEE.
Walcott et al.; "Dynamic Prediction of Architectural Vulnerability From Microarchitectural State"; Technical Report CS-2007-05; Nov. 2006; pp. 1-23.
Franklin; "A Study of Time Redundant Fault Tolerance Techniques for Superscalar Processors"; 1995; pp. 207-215; IEEE.

* cited by examiner

*Primary Examiner* — George Giroux

(57) ABSTRACT

A method includes: decoding an instruction a first time to obtain a first decoded instruction; decoding the instruction a second time to obtain a second decoded instruction; comparing at least a portion of the first decoded instruction to at least a portion of the second decoded instruction; and when the at least a portion of the first decoded instruction matches the at least a portion of the second decoded instruction, executing the instruction.

14 Claims, 3 Drawing Sheets

DATA PROCESSING SYSTEM HAVING SELECTIVE REDUNDANCY AND METHOD THEREFOR

BACKGROUND

1. Field

This disclosure relates generally to data processing, and more specifically, to a data processing system having temporally selective redundancy.

2. Related Art

Integrated circuit data processing systems used in safety-critical applications, such as those used in automotive anti-lock braking, generally require redundancy to detect soft (transient) and hard (permanent) failures. One redundancy technique, known as modular redundancy, provides two or more processors executing the same instructions in "lock-step". The actions of two fully operational processors running in lockstep are identical. An error is indicated when the processor actions differ from each other. Running processors in lockstep to provide hardware redundancy is very expensive in both system cost and power consumption. It is also inflexible and effectively doubles the chances of failures occurring. Temporal redundancy is most commonly used to detect and correct soft errors. In general, temporal redundancy re-performs operations in the same form, or in an equivalent form, on the same hardware. Temporal redundancy has had limited success in detecting and correcting hard errors. Hard errors are more commonly detected by circuit redundancy in which operations may be performed, simultaneously or not, in separate circuitry.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
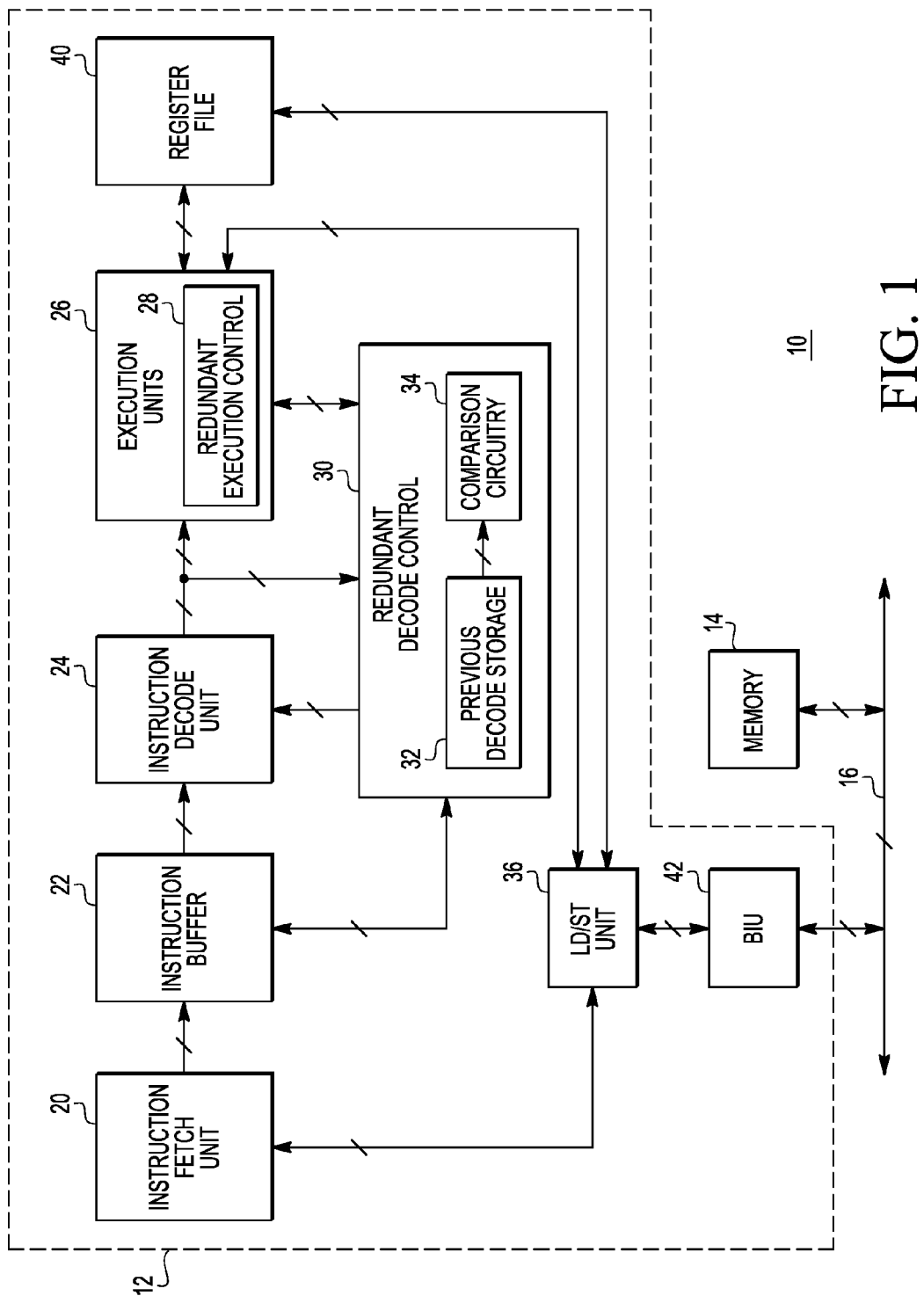
FIG. 1 illustrates, in block diagram form, a data processing system in accordance with an embodiment.

In one embodiment, a data processing system implements decode verification and performs selective redundancy during instruction execution. As used herein, redundant execution (i.e. redundancy) can be temporal redundancy (e.g., re-performing operations in the same form, or in an equivalent form, on the same hardware) or circuit redundancy (e.g. performing the same operations, simultaneously or not, in separate circuitry). A decision of whether or not to introduce redundancy for a current instruction may be based on an instruction class of the current instruction. That is, for some classes of instructions, performing redundancy (such as by running the same instruction a second time or by running an equivalent instruction) may have little value because doing so is unlikely to detect an error, or can even over-complicate execution. Such instruction classes may include, for example, load and store instructions with end-to-end cycle redundancy check (CRC), instructions which perform translation lookaside buffer (TLB) actions, and simple arithmetic logic unit (ALU) instructions. Therefore, it may be desirable to improve throughput by only performing redundancy for a current instruction when it is sufficiently beneficial to do so, compared to the throughput loss of redundant execution. Furthermore, a data processing system may, in real-time, control when redundancy is performed. For example, as the instruction mix changes dynamically, the instruction classes relied upon most may be checked more frequently. In another example, if an instruction has encountered an error, then the instruction class of that instruction may be checked more frequently. These examples are meaningful in part because instructions within the same instruction class often share implementation circuitry. A current instruction's corresponding instruction class is typically determined as a result of decoding the current instruction. Therefore, in one embodiment, an instruction is decoded at least twice in order to verify that the decoded instruction was decoded correctly. In this manner, any decision or information determined based on the decoding of the current instruction (such as whether or not to perform redundancy) may be more accurate. Mistakenly choosing not to redundantly execute a safety-critical instruction, because it was misidentified in decode, could constitute a considerable loss in fault tolerance.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

FIG. 1 illustrates, in block diagram form, a data processing system 10 in accordance with an embodiment. Data processing system 10 includes processor 12, memory 14, and bus 16. Processor 12 includes instruction fetch unit 20, instruction buffer 22, instruction decode unit 24, redundant decode control 30, execution units 26, load/store (LD/ST) unit 36, register file 40, and bus interface unit (BIU) 42. Execution units 26 include redundant execution control 28, and may also include any number of execution units, such as, for example, arithmetic logic units (ALUs), floating point units, etc., as well as execution control circuitry. Redundant decode control 30 includes previous decode storage 32 and comparison circuitry 34.

Memory 14 is bi-directionally connected to bus 16. Memory 14 can be any memory type having a plurality of volatile or non-volatile memory cells. Commonly used memory types include read only memory (ROM), static random access memory (SRAM), dynamic random access memory (DRAM), and flash memory. Data processing system 10 may include elements other than those illustrated, or may include more or fewer than those illustrated. For example, data processing system may include more of fewer processors and/or memories.

Processor 12 may be any type of processor, such as for example, a microprocessor, microcontroller, digital signal processor (DSP), or the like. Processor 12 may also be referred to as a processor core. In one embodiment, processor 12 is formed on a single integrated circuit. In the illustrated embodiment, processor 12 is a pipelined processor. In processor 12, instruction fetch unit 20 is bi-directionally connected to LD/ST unit 36. Load/store unit 36 is also bi-directionally connected to BIU 42, execution units 26, and register file 40. Execution units 26 are bi-directionally connected to register file 40 and redundant decode control 30. Instruction fetch unit 20 is connected to instruction buffer 22 which is connected to instruction decode unit 24, which is connected to execution units 26. Instruction decode unit 24 is bi-directionally connected to redundant decode control 30, instruction buffer 22 is bi-directionally connected to redundant decode control 30, and execution units 26 is bi-directionally connected to redundant decode control 30.

Processor 12 communicates with other portions of data processing system 12, such as for example, memory 14 via BIU 42. During normal instruction processing, instruction fetch unit 20 fetches instructions from LD/ST unit 36. The instructions are then stored in instruction buffer 22 and subsequently decoded by instruction decode unit 22. The instructions are then provided to execution units 28 (which may include any number of pipelined stages, or alternatively, could be implemented in other ways, such as microcoding). During execution, register file 40 and/or memory 14 can be accessed as needed, such as to obtain operands or store results. Execution units 26 can perform arithmetic, logical, shifting, or other operations using data stored in register file 40 as needed for executing the instructions received from instruction decode unit 24. Execution units 26 may include, for example, arithmetic logic units (ALUs), floating point units, etc., and may also include control circuitry for controlling the execution of an instruction. Register file 40 includes a plurality of general purpose registers (GPRs), and other types of registers. Register file 40 can provide or receive control information and data to or from execution units 28 and to or from LD/ST unit 36.

As will be described in more detail below, in one embodiment, each instruction fetched by instruction fetch unit 20 is decoded twice such that the correct decoding of the instruction may be verified. In one embodiment, only those instructions verified to have been correctly decoded are executed by execution units 26.

Figure 2:
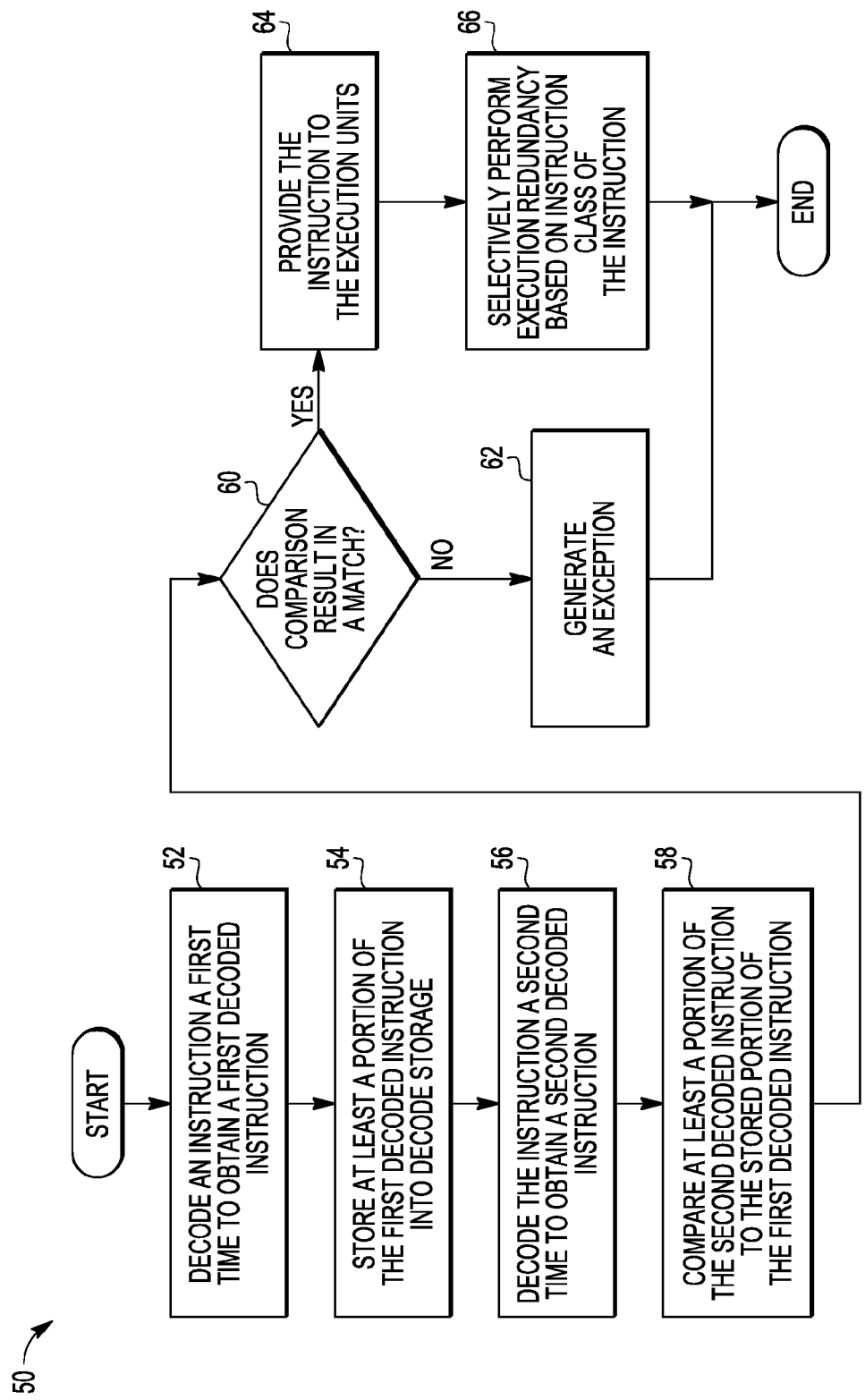
FIG. 2 illustrates a flow chart of a method for verifying correct decode in accordance with an embodiment.

FIG. 2 illustrates a flow chart of a method 50 for verifying correct decode in accordance with an embodiment. In method 50, flow begins with block 52 in which an instruction is decoded a first time to obtain a first decoded instruction. Flow proceeds to block 54 in which at least a portion of the first decoded instruction is stored into decode storage. For example, referring to FIG. 1, all or a portion of the first decoded instruction may be received by redundant decode control 30 from instruction decode unit 24 and stored in previous decode storage 32. Referring back to FIG. 2, flow proceeds to block 56 in which the same instruction is decoded a second time to obtain a second decoded instruction. Flow then proceeds to block 58 in which at least a portion of the second decoded instruction is compared to the stored portion of the first decoded instruction. For example, referring to FIG. 1, comparison circuitry 34 can compare the information stored in previous decode storage 32 with a corresponding portion of the second decoded instruction which resulted from decoding the instruction a second time. In one embodiment, the full first decoded instruction is stored in previous decode storage 32 and is compared with the full second decoded instruction. Alternatively, a portion which is less than the full first decoded instruction is stored in previous decode storage 32 and is compared with a corresponding portion of the second decoded instruction (which is also less than the full second decoded instruction). An example of an embodiment that may save and compare only a portion of the decode information is one that redundantly decodes and checks only instruction class information. In another embodiment, the size of decode storage 32 could be reduced by saving and subsequently comparing a CRC (compression) of the decoded instruction.

Referring back to FIG. 2, flow proceeds to decision diamond 60 in which it is determined whether the comparison results in a match. If so, flow proceeds to block 64 in which the instruction is provided to execution units 26 and executed. Flow then continues to block 66 in which execution redundancy is selectively performed based on the instruction class of the instruction. If, at decision diamond 60, the comparison did not result in a match, flow proceeds to block 62 in which an exception is generated. After either blocks 62 or 66, method 50 ends. In one embodiment, in block 62, an exception may not be generated. Instead, the same instruction may be decoded a third time to determine whether or not an exception should be generated or whether the instruction is to be provided to execution units 26.

Therefore, as can be seen from FIG. 2, in one embodiment, an instruction is provided for execution by execution units 26 only if its decode is considered correct by performing the decoding of the instruction twice. In one embodiment, in order to decode a same instruction twice, each instruction stored in instruction buffer 22 is stored twice. Although this may reduce the effective depth of the instruction buffer, it may allow for more extensive testing of instruction buffer 22 circuitry. In one embodiment, each instruction in instruction buffer 22 is indicated as an original instruction or a repeat instruction. In this manner, redundant decode control 30 may be aware of which instruction is an original instruction versus a repeat instruction, such that, upon a match, only one instruction corresponding to the original instruction is provided to execution units 26. In an alternate embodiment, rather than the 100% redundancy of storing each instruction twice in instruction buffer 32, each entry in instruction buffer 32 may have error checking and correction (ECC) protection. This may require much less redundancy overhead, but may complicate timing. In another embodiment, each instruction fetched by instruction fetch unit 20 may be stored only once in instruction buffer 22. In this embodiment, redundant decode control may include additional control circuitry, such as, for example, a state machine, which causes each original instruction to be sent back to instruction decode unit 24 to be decoded again. In this embodiment, redundant decode control 30 may resend the instruction and compare the result of the resent instruction to the stored decoded original instruction, and if a match occurs, provide the original instruction to execution units 26. In one embodiment, each original instruction decoded by instruction decode unit 24 is provided to execution units 26 in which redundant decode control 30 only allows the decoded instructions which are deemed (by comparison circuitry 34) to have been correctly decoded to be executed by execution units 26. Alternatively, only those original instructions deemed to have been correctly decoded are even provided to execution units 26. Note that, in alternate embodiments, rather than provide the original instruction to execution units 26, the repeat instruction may be provided instead.

In yet another alternate embodiment, instruction buffer 22 may provide each instruction to two different instruction decode units such that each instruction is decoded twice. In this example, redundant decode control may compare at least a portion of the first decoded instruction decoded by a first instruction decode unit to a corresponding portion of the second decoded instruction decoded by a second instruction decode unit to determine whether the decode was correctly performed. The result of this comparison may then be used to determine whether the decoded instruction is to be executed by execution units 26. Furthermore, redundant decode control 30 may select which instruction decode unit provides the decoded instruction to execution units 26. Also, in this embodiment, if the decodes of the instructions are performed in parallel by the two decode units, the storing of block 54 may not be performed.

Figure 3:
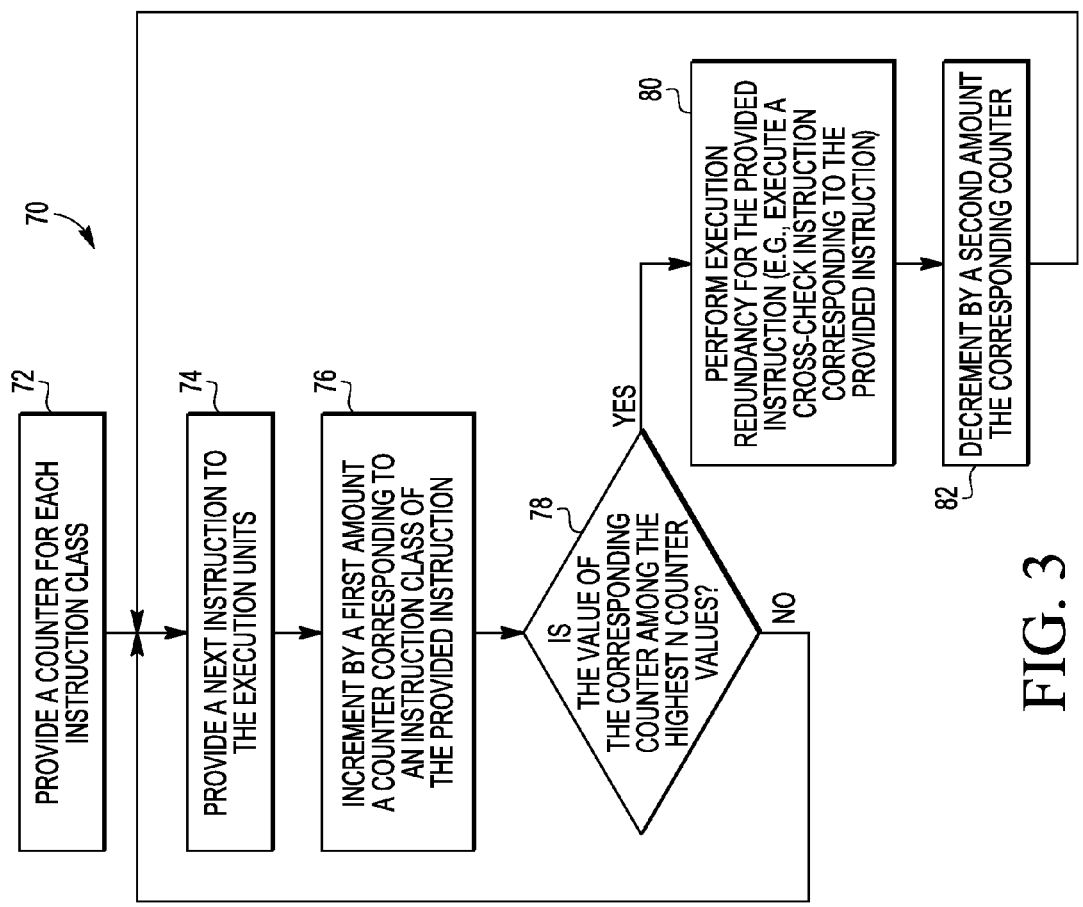

FIG. 3 illustrates a flow chart of a method 70 for controlling redundancy in accordance with an embodiment. This method dynamically varies the mix of instructions, by instruction class, that are redundantly executed. It does so based upon dynamic frequency of usage, and upon whether those instructions encountered errors in earlier execution. Note that this method may or may not be used in conjunction with redundant-decode method 50 of FIG. 2. Referring back to FIG. 3, method 70 begins with block 72 in which a counter is provided for each instruction class. For example, redundant execution control 28 within execution units 26 may include a counter for each instruction class identified for use within processor 12. For example, each of the following may be considered a different instruction class: load/store instructions; load/store multiple registers instructions; simple ALU instructions; multiply instructions; divide instructions; branch/jump instructions; jump-to-subroutine instructions; return from subroutine instructions; floating-point add/subtract instructions; floating-point multiply instructions; floating-point divide instructions; vector single instruction multiple data (SIMD) instructions; synchronization instructions (such as for software semaphores); and special-purpose instructions (such as flushing cache entries, etc.). For example, in one embodiment, an instruction class may include a particular function such as a load, store, multiply, divide, branch, add, shift, or jump. Any number of instruction classes may have a corresponding counter within processor 12. Also, one or more of the instruction classes may be grouped together into a single class, or one or more of the classes may be further separated into additional classes. In one embodiment, a counter for an instruction class is only included if redundancy is to be controlled based on that instruction class.

Flow then proceeds to block 74 in which a next instruction is provided to execution units 26. In one embodiment, if repeated decodes are performed (such as was described in reference to FIG. 2), the "next instruction" is one of the two instructions which were decoded (the original or the repeat instruction) and which resulted in a match. In this embodiment, it may be assumed that each instruction provided in block 74 has been correctly decoded, thus allowing for improved fault tolerance. In another embodiment in which repeated decodes are not performed, the "next instruction" provided in block 74 may be any instruction provided by instruction decode unit 24 to execution units 26. Flow then proceeds to block 76 in which the counter corresponding to an instruction class of the provided instruction is incremented by a first amount. In one embodiment, this first amount may be one, such that the counter is an actual count of the number of instructions within the corresponding instruction class of the counter. However, in an alternate embodiment, the first amount may be variable, such as being proportional to the instruction class's comparative susceptibility to hard or soft errors. Flow then proceeds to block 78 in which it is determined if the value of the corresponding counter is among the "N" highest counter values. For example, N can be any integer value greater than or equal to one, and less than or equal to the number of instruction classes, and may represent the number of counters to compare against. For example, if N is 3, then the value of the corresponding counter (which was incremented in block 76) is compared to the values of the 3 counters who currently have the highest values, and if the value of the corresponding counter is at least as high as the lowest-valued counter of the 3 highest-valued counters, it is among the highest 3 counter values (and the result of decision diamond 78 is "yes"). Similarly, if N is 1, then the value of the corresponding counter is compared to the highest value of all the counters, and the result of decision diamond 78 is "yes" if the value of the corresponding counter is at least as high as the highest value. Therefore, in decision diamond 78, it is determined whether the value of the corresponding counter is above a predetermined value, where this predetermined value may, for example, correspond to the lowest counter value of the top N counter values. Alternatively, the predetermined value may be determined in a different manner. Therefore, note that if the comparison in decision diamond 78 compares favorably, flow proceeds to decision diamond 80 in which execution redundancy is performed for the provided instruction. If the comparison in decision diamond 78 does not compare favorably (e.g. if the result is "no"), flow returns to block 74.

In block 80, execution redundancy is performed for the provided instruction. For example, in one embodiment, redundancy is performed temporally by executing a cross-check instruction corresponding to the provided instruction. In an alternate embodiment, such as in a superscalar processor core or certain forms of VLIW (Very Long Instruction Word) processors, redundant execution could be simultaneously performed in separate circuitry. In one embodiment, the cross-check instruction is identical to the provided instruction and is used to determine whether the provided instruction and the cross-check instruction have a same result, thus indicating the provided instruction is executed correctly. Therefore, in one embodiment, performing redundant execution includes executing the instruction at least two consecutive times and comparing the results of the execution. Alternatively, the cross-check instruction may be a different instruction which otherwise checks the correctness of the execution of the provided instruction. After block 80, flow proceeds to block 82 in which the corresponding counter (corresponding to the instruction class of the provided instruction) is decremented by a second amount. In one embodiment, the first amount is different than the second amount. In one embodiment, the first amount is less than the second amount. For example, by decrementing the corresponding counter in block 82, the current instruction class will be checked less often. That is, since execution redundancy was just performed for the corresponding instruction class (in block 80), its counter value can be lowered to allow other instruction classes to be "among the highest N counter values" in decision diamond 78, thus giving other classes a greater chance of being checked by performing redundancy. After block 82, flow returns to block 74.

Figure 4:
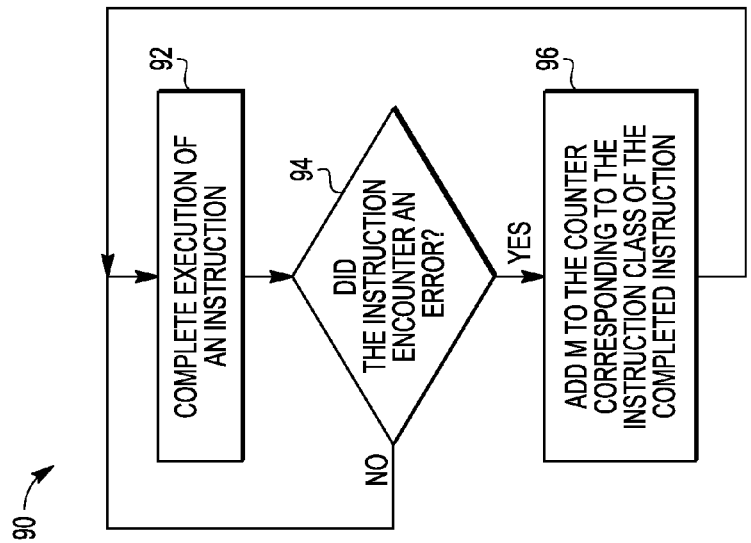
FIGS. 3 and 4 illustrate flow charts of methods for controlling selective redundant execution in accordance with an embodiment.

FIG. 4 illustrates a flow chart of a method 90 for controlling redundancy in accordance with an embodiment. This method may be used in conjunction with method 70 of FIG. 3 to adjust redundancy based upon occurrences of errors in instruction execution. Method 90 of FIG. 4 begins with block 92 in which execution of an instruction is completed. Flow then proceeds to decision diamond 94 in which it is determined whether the instruction which completed execution encountered an error (or a failure). If so, flow proceeds to block 96 in which a value "M" is added to the counter corresponding to the instruction class of the completed instruction. In this manner, since the instruction encountered an error, adding M to its counter value increases scrutiny of the corresponding instruction class, such that, as described in reference to FIG. 3, it becomes eligible for redundancy sooner (it allows for the result of decision diamond 78 to be a "yes" sooner than if the counter were not updated by adding M). If, at decision diamond 94, the instruction did not encounter an error, flow returns to block 92 in which, when execution of a next instruction is completed, flow again proceeds to decision diamond 94. Therefore, in this manner, the frequency of performing execution redundancy may be increased for those instruction classes which have an instruction which actually did encounter an error during execution. In an alternate embodiment of method 90, if the instruction does not encounter an error (the result of decision diamond 94 flows back to block 92), the counter could be decremented by another amount before proceeding to block 92.

Note that, in the descriptions of FIGS. 3 and 4, the counter is described as being incremented (e.g. in block 76 and 96) and decremented (e.g. in block 82). However, in alternate embodiments, the counter may be updated in different directions than those described above with the amounts being added or subtracted also being adjusted as needed. In another alternate embodiment, multiplication and division factors could be used instead of increment and decrement amounts. Whether implemented by additive or multiplicative factors, some embodiments will use saturating arithmetic to prevent increasing the counter's value past the largest value the counter can hold, or decreasing its value below the lowest value it can hold. Alternatively, some embodiments will scale the additive or multiplicative adjustments so that they asymptotically approach, but not surpass these limits.

Therefore, by now it can be understood how redundancy can be selectively performed, based on instruction class, in a manner which may be more beneficial to detecting errors, and which may allow for reduced impact upon performance. Furthermore, in order to ensure that the instruction class is correctly determined, each instruction may be decoded twice in order to verify correctness of the decoding by instruction decode unit 24.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a method including decoding an instruction a first time to obtain a first decoded instruction; decoding the instruction a second time to obtain a second decoded instruction; comparing at least a portion of the first decoded instruction to at least a portion of the second decoded instruction; and when the at least a portion of the first decoded instruction matches the at least a portion of the second decoded instruction, executing the instruction. Item 2 includes the method of item 1, wherein when the first decoded instruction does not match the second decoded instruction, generating an exception. Item 3 includes the method of item 1, and further includes performing redundant execution of the instruction based on an instruction class of the instruction. Item 4 includes the method of item 3, wherein the instruction class comprises a function selected from a group consisting of load, store, multiply, divide, branch, add, shift, and jump. Item 5 includes the method of item 3, and further includes providing a counter corresponding to each instruction class of a plurality of instruction classes; providing the instruction to an execution unit of a data processing system; updating the counter corresponding to the instruction class of the instruction by a predetermined amount; determining that a stored value of the updated counter compares favorably to a predetermined value; and performing redundant execution on the instruction. Item 6 includes the method of item 3, and further includes providing a counter corresponding to each instruction class of a plurality of instruction classes; executing the instruction in an execution unit of a data processor; determining that the instruction encountered an error; and updating a counter corresponding to an instruction class of the executed instruction by a predetermined value. Item 7 includes the method of item 3, wherein performing redundant execution on the instruction further comprises executing the instruction in an execution unit at least two consecutive times and comparing results of the execution. Item 8 includes the method of item 1, and further includes storing at least a portion of the first decoded instruction.

Item 9 includes, in a data processing system having an execution unit, a method including decoding an instruction a first time to obtain a first decoded instruction; storing at least a portion of the first decoded instruction; decoding the instruction a second time to obtain a second decoded instruction; comparing the at least a portion of the first decoded instruction to at least a portion of the second decoded instruction; when the at least a portion of the first decoded instruction matches the at least a portion of the second decoded instruction, executing the instruction; and performing redundant execution on the instruction based on an instruction class of the instruction. Item 10 includes the method of item 9, wherein when the first decoded instruction does not match the second decoded instruction, generating an exception. Item 11 includes the method of item 9, wherein the instruction class comprises a function selected from a group consisting of load, store, multiply, divide, branch, add, shift, and jump. Item 12 includes the method of item 9, and further includes providing a counter corresponding to each instruction class of a plurality of instruction classes; providing the instruction to an execution unit of a data processing system; updating the counter corresponding to the instruction class of the instruction by an amount; determining that a stored value of the updated counter is above a predetermined value; and performing redundant execution on the instruction. Item 13 include the method of item 9, and further includes providing a counter corresponding to each instruction class of a plurality of instruction classes; executing the instruction in an execution unit of a data processor; determining that the instruction encountered an error; and updating a predetermined value to a counter corresponding to an instruction class of the executed instruction. Item 14 includes the method of item 9, wherein performing redundant execution on the instruction further comprises executing the instruction in an execution unit at least two consecutive times and comparing results of the execution.

Item 15 includes a data processing system including an execution unit for executing instructions; an instruction decode unit for decoding instructions to be executed; and a redundant decode control unit coupled to the instruction decode unit and to the decode storage unit, the redundant decode control unit for causing an instruction to be decoded twice in the instruction decode unit producing a first decoded instruction and a second decoded instruction, wherein the redundant decode control unit for causing at least a portion of the first decoded instruction to be compared to at least a portion of the second decoded instruction, and when the portion of the first decoded instruction matches the portion of the second decoded instruction, the redundant decode control unit for causing the first decoded instruction to be provided to the execution unit. Item 16 includes the data processing system of item 15, and further includes a decode storage unit for storing the first decoded instruction. Item 17 includes the data processing system of item 15, and further includes a redundant execution control unit for causing redundant execution of the first decoded instruction based on an instruction class of the instruction. Item 18 includes the data processing system of item 17 and further includes a plurality of counters, one counter of the plurality of counters corresponding to an instruction class of a plurality of instruction classes. Item 19 includes the data processing system of item 18, wherein each of the plurality of instruction classes comprises a function selected from a group consisting of load, store, multiply, divide, branch, add, shift, and jump. Item 20 includes the data processing system of item 15, wherein the execution unit, instruction decode unit, redundant decode control unit are part of a processor implemented on a single integrated circuit.

What is claimed is:

1. A method comprising:
   decoding an instruction a first time to obtain a first decoded instruction;
   decoding the instruction a second time to obtain a second decoded instruction;
   comparing at least a portion of the first decoded instruction to at least a portion of the second decoded instruction;
   when the at least a portion of the first decoded instruction matches the at least a portion of the second decoded instruction, executing the instruction;
   when the at least the portion of the first decoded instruction does not match the at least the portion of the second instruction, not executing the instruction;
   providing a counter corresponding to each instruction class of a plurality of instruction classes; and
   when the at least a portion of the first decoded instruction matches the at least a portion of the second decoded instruction, the method further comprises:
     providing the instruction to an execution unit of a data processing system;
     updating the counter corresponding to the instruction class of the instruction by a predetermined amount;
     determining that a stored value of the updated counter matches a predetermined value; and
     performing redundant execution on the instruction in response to determining that the stored value of the updated counter matches the predetermined value.

2. The method of claim 1, wherein when the first decoded instruction does not match the second decoded instruction, generating an exception.

3. The method of claim 1, wherein the instruction class comprises a function selected from a group consisting of load, store, multiply, divide, branch, add, shift, and jump.

4. The method of claim 1, further comprising:
   determining that the instruction encountered an error during execution; and
     updating a counter corresponding to an instruction class of the executed instruction by a second predetermined value.

5. The method of claim 1, wherein performing redundant execution on the instruction further comprises executing the instruction in an execution unit at least two consecutive times and comparing results of the execution.

6. The method of claim 1, further comprising storing at least a portion of the first decoded instruction.

7. In a data processing system having an execution unit, a method comprising:
   providing a counter corresponding to each instruction class of a plurality of instruction classes;
   providing an instruction to an execution unit of a data processing system;
   updating the counter corresponding to the instruction class of the instruction by an amount;
   determining that a stored value of the updated counter is above a predetermined value; and
   performing redundant execution on the instruction in response to determining that the stored value of the updated counter is above the predetermined value.

8. The method of claim 7, wherein the instruction class comprises a function selected from a group consisting of load, store, multiply, divide, branch, add, shift, and jump.

9. The method of claim 7, further comprising:
- determining that the instruction encountered an error during execution; and
- updating a counter corresponding to an instruction class of the executed instruction by a second predetermined value.

10. The method of claim 7, wherein performing redundant execution on the instruction further comprises executing the instruction in an execution unit at least two consecutive times and comparing results of the execution.

11. A data processing system comprising:
- an execution unit for executing instructions;
- a plurality of counters, one counter of the plurality of counters corresponding to an instruction class of a plurality of instruction classes;
- an instruction decode unit for decoding instructions to be executed; and
- a redundant decode control unit coupled to the instruction decode unit, the redundant decode control unit configured to cause an instruction to be decoded twice in the instruction decode unit producing a first decoded instruction and a second decoded instruction, wherein the redundant decode control unit is configured to cause at least a portion of the first decoded instruction to be compared to at least a portion of the second decoded instruction, and when the portion of the first decoded instruction matches the portion of the second decoded instruction, the redundant decode control unit is configured to cause the first decoded instruction to be provided to the execution unit, and further configured to update the counter corresponding to the instruction class of the instruction by a predetermined amount, determining that a stored value of the updated counter matches the predetermined value, and performing redundant execution on the instruction in response to the stored value of the updated counter matching the predetermined value.

12. The data processing system of claim 11, further comprising a decode storage unit configured to store the first decoded instruction.

13. The data processing system of claim 11, wherein each of the plurality of instruction classes comprises a function selected from a group consisting of load, store, multiply, divide, branch, add, shift, and jump.

14. The data processing system of claim 11, wherein the execution unit, instruction decode unit, redundant decode control unit are part of a processor implemented on a single integrated circuit.

* * * * *